Figure 1:
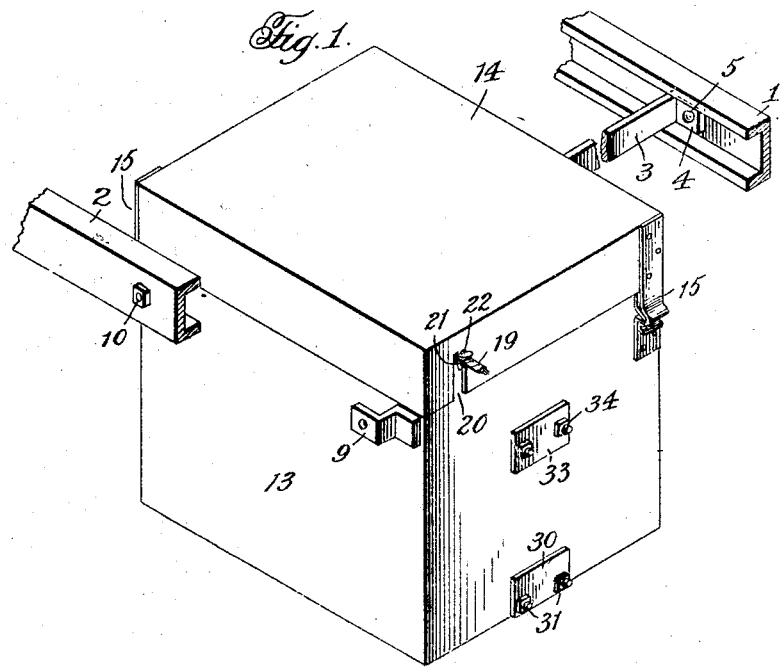

Sept. 22, 1925. 1,554,300
W. W. SELLERS
BATTERY BOX
Filed July 13, 1921 2 Sheets-Sheet 1

Witness:
Jas. E. Hutchinson

Inventor:
Walter W. Sellers,
By Milans & Milans
Attorneys.

Sept. 22, 1925.  
W. W. SELLERS  
BATTERY BOX  
Filed July 13, 1921.  
1,554,300  
2 Sheets-Sheet 2
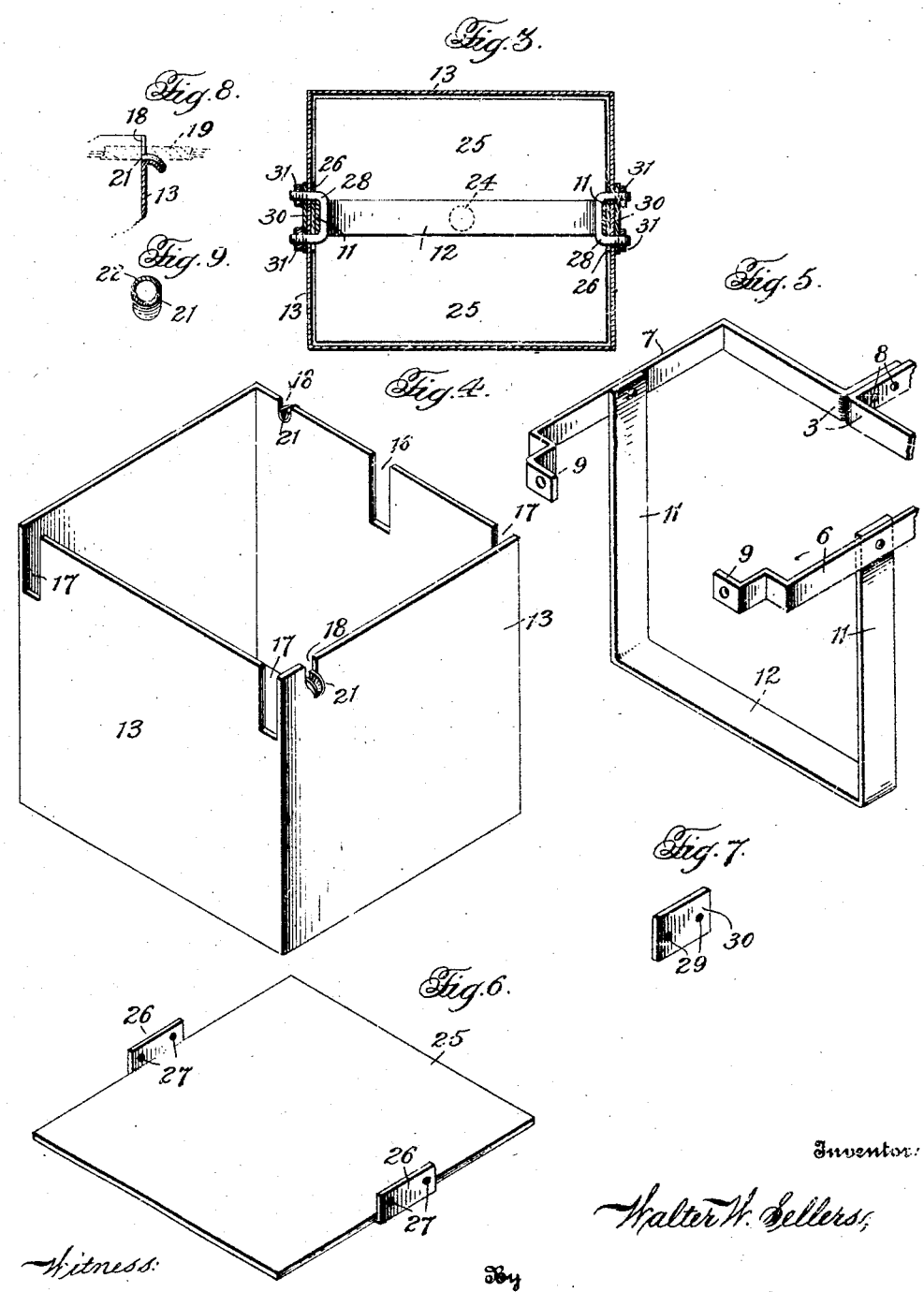

Patented Sept. 22, 1925.

1,554,300

UNITED STATES PATENT OFFICE.

WALTER W. SELLERS, OF CHARLOTTE, NORTH CAROLINA.

BATTERY BOX.

Application filed July 13, 1921. Serial No. 484,290.

*To all whom it may concern:*

Be it known that I, WALTER W. SELLERS, a citizen of the United States, residing at Charlotte, in the county of Mecklenburg and State of North Carolina, have invented certain new and useful Improvements in Battery Boxes, of which the following is a specification, reference being had therein to the accompanying drawing.

My invention relates to new and useful improvements in a battery box and more particularly to such a device for receiving and protecting the battery used in connection with the starting and lighting system of a Ford automobile.

The primary object of the invention resides in the provision of a battery box which may be used with the battery holding equipment now commonly found on Ford automobiles and one having a removable cover whereby the battery may be easily placed in position in the box or removed therefrom.

A further object consists in forming the box with a false bottom so constructed that any water which may gain access to the box may drain therefrom and providing means for the circulation of air to dry the battery as well as the box.

Another object resides in the provision of a novel and simple means for securing the box on the frame carried by the automobile chassis.

With the above and other objects in view, which will appear as the description proceeds, my invention consists in the novel details of construction and arrangement of parts described in the following specification and illustrated in the accompanying drawings and while I have illustrated and described the preferred embodiments of the invention it will be understood that such changes may be made as will fall within the scope of the appended claims.

In the drawings:—

Figure 2:
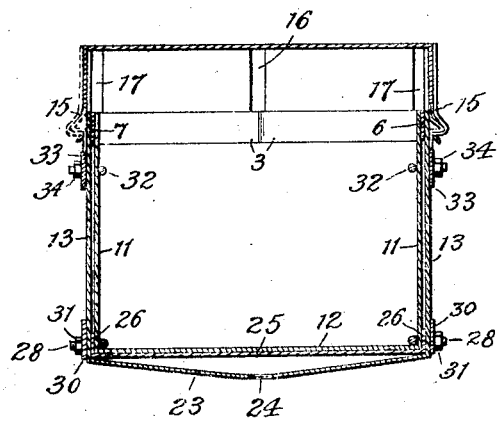

Fig. 1 is a perspective showing the manner of securing the box to the automobile chassis, Fig. 2 is a longitudinal vertical section through the box, Fig. 3 is a horizontal section through the box, Fig. 4 is a perspective of the box with the cover and associated parts removed, Fig. 5 is a fragmental perspective of the box supporting frame, Fig. 6 is a perspective of the false bottom, Fig. 7 is a detail perspective showing one of the plates used in securing the box in the supporting frame, Fig. 8 is a fragmental vertical section showing in detail a lip formed on the box for supporting the wire, and Fig. 9 is a transverse section through the wire supporting lip.

In the drawings 1 and 2 indicate respectively, the right and left hand side rails of the automobile chassis, the battery supporting frame being secured to and extending between these rails. The battery supporting frame comprises the bar 3, one end of which is bent to form the right angle extension 4 through which a bolt 5 or other suitable fastening passes for securing the bar to the side rail 1, and the opposite end is bent to form one arm 6 of a rectangular yoke, the other arm of the yoke being shown at 7 and secured to the bar 3 by the rivets 8 or other suitable fastening means. Each of the arms 6 and 7 of the yoke have an inwardly directed extension 9, through which bolts 10 or other suitable fastening means pass for securing the frame to the side rail 2. A substantially U shaped member is suspended from the yoke, this member comprising the vertically extending sides 11 and the horizontally extending bottom or connecting bar 12. The parts so far described go forward to make up the battery support now generally found as a part of the equipment of the Ford automobile.

My improved form of battery box comprises a horizontal body 13 and a removable cover 14, said cover being detachably connected to the body by the spring catches 15 which are arranged on opposite sides of the box as shown. A notch 16 is formed in the edge of one side of the box 13 for receiving the bar 3 of the supporting frame, and the rectangular spaced notches 17 are formed in the opposite side for receiving the arms 6 and 7 of the yoke. These notches 16 and 17 are of sufficient depth to receive the bar and arms and allow the cover to be placed in position, as more clearly shown in Figure 1. Notches 18 are also formed in the edges of the body, at right angles for allowing the entrance of the terminal wires 19, and notches 20 are formed in the edges of the cover 14 to pass over the wires 19 as more clearly shown in Fig. 1. Extending outwardly from the bottom of the notches 18 are the concaved lips 21, the outer ends of which are slightly curved downwardly, these lips forming supports for the wires 19 and preventing the cutting thereof. Convex lips 22 extend from the top of the notches 20 in the cover and with the lips 21 go forward to make up a substantially circular passage for the wire. The bottom 23 of the body 13 is hopper shaped and is provided in the lowermost point with an opening 24 for a purpose to be later described.

A false bottom 25 is secured in the body of the box and extends over the hopper shaped bottom 23. This false bottom is of less diameter than the interior diameter of the box so as to leave a space between the said false bottom and sides of the box. Upwardly extending lugs or ears 26 are formed on opposite sides of the false bottom and are each provided with spaced openings 27 to receive the substantially U shaped fastening bolts 28 which when the parts are assembled straddle the sides 11 of the depending member from the yoke of the supporting frame, rest on the top of the horizontal connecting member 12, pass through the openings in the sides of the body 13, through openings 29 in the plates 30, and receive the securing nuts 31. Similar substantially U shaped bolts 32 straddle the sides 11 of the depending member of the frame yoke, adjacent the top, pass through openings in the sides of the body, through the plates 33 engaging the outer face of the body, and receive the secured nuts 34.

From the above it will be seen that I have provided a box for receiving the battery so as to protect the same against water, dirt, etc., the box being of simple and inexpensive construction and secured to the frame connected to the chassis in a novel and easy manner. The body 13 of the box will receive the yoke and depending member of the supporting frame and the false bottom 25 will allow water which may enter the box to drain through the opening 24 and after the water is drained air will enter the opening 24, engage the undersurface of the false bottom, being directed to and around the edges of the false bottom, and pass up into the box, thereby drying the same. The cover 14 is easily connected and disconnected by means of the spring catches 15 and the U shaped bolts 28 engaging the upper surface of the horizontal bar 12 of the depending frame member will hold the box from dropping from the frame. When the nuts 31 and 34 on the bolts 28 and 32 respectively are tightened the parts will be drawn together so that there will be no rattling when the automobile is driven. It will also be understood that my box is attested for use with and connected to the battery supporting frame now found as a part of the equipment of Ford automobiles. The plates 30 and 33 engaging the outer faces of the body act as washers for the nuts and will prevent moisture from entering the openings in the box through which the U shaped fastening bolts pass.

Having fully described my invention, what I claim as new and desire to secure by Letters Patent is:—

1. In combination with a supporting frame, a battery box, a false bottom received in the box, and means extending through the false bottom and box and engaging the frame for securing the false bottom to the box and the box to the frame.

2. In combination with a supporting frame, a battery box, a false bottom received in the box, lugs formed on the false bottom, and means passing through the lugs and sides of the box and engaging the frame for connecting the false bottom to the box and the box to the frame.

3. In combination with a supporting frame having a substantially U shaped depending member, a battery box receiving the depending member, a false bottom received in the box and having lugs formed thereon, and means passing through the lugs and sides of the box and engaging the upper surface of the bottom of the depending member for securing the false bottom to the box and the box to the frame.

4. In combination with a supporting frame having a substantially U shaped depending member, a battery box receiving the depending member, a false bottom received in the box and having lugs formed thereon, and means engaging the upper surface of the bottom of the depending member, straddling the sides of the member, and passing through the lugs and sides of the box for securing the false bottom to the box and the box to the frame.

5. In combination with a supporting frame, a battery box, a false bottom received in the box, and common means for detachably connecting the false bottom in the box and the box to the frame.

6. In combination with a supporting frame, a battery box, a false bottom received in the box, and common means for detachably connecting the false bottom in the box and the box to the frame, said means extending through the false bottom and box and engageable with the frame.

In testimony whereof I hereunto affix my signature.

WALTER W. SELLERS.